Figure 1:
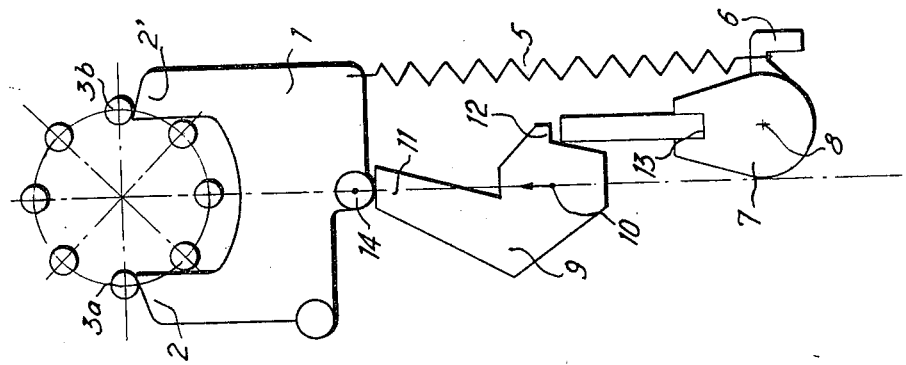

United States Patent [19]

Besancenot

[11] 4,030,822
[45] June 21, 1977

[54] MECHANISM FOR CONTROLLING THE ADVANCE OF A MAGAZINE IN A TRANSPARENCY PROJECTOR

[76] Inventor: Serge Besancenot, 20, Avenue de Levry, 93270 Sevran, France

[22] Filed: Oct. 22, 1975

[21] Appl. No.: 624,829

[52] U.S. Cl. .............................................. 353/103
[51] Int. Cl.² ......................................... G03B 23/00
[58] Field of Search .......... 353/103, 114, 116, 117; 40/79

[56] References Cited

UNITED STATES PATENTS

| | | | |
|---|---|---|---|
| 2,874,497 | 2/1959 | Huff | 353/103 |
| 3,165,971 | 1/1968 | Zillmer | 353/116 |
| 3,218,922 | 11/1965 | Mahoney | 353/116 |
| 3,690,186 | 9/1972 | Fleissmer | 353/103 |

Primary Examiner—Harry N. Haroian

[57] ABSTRACT

An arrangement for controlling the advance of a magazine in a transparency projector in which a fork advancing the magazine, is subjected to the action of a return spring having one end constantly fixed to a control member which is pivotally mounted about a fixed axis. An operating member having a cam-shaped portion cooperates with the control member so that the advance of the operating member towards the fork initially pivots the control member due to the action of the cam-shaped portion. The fork becomes thereby pivoted by the return spring until the extreme position is reached, in which the fork is locked against the magazine. When the operating member is withdrawn, the fork is released from engagement with the magazine.

5 Claims, 8 Drawing Figures

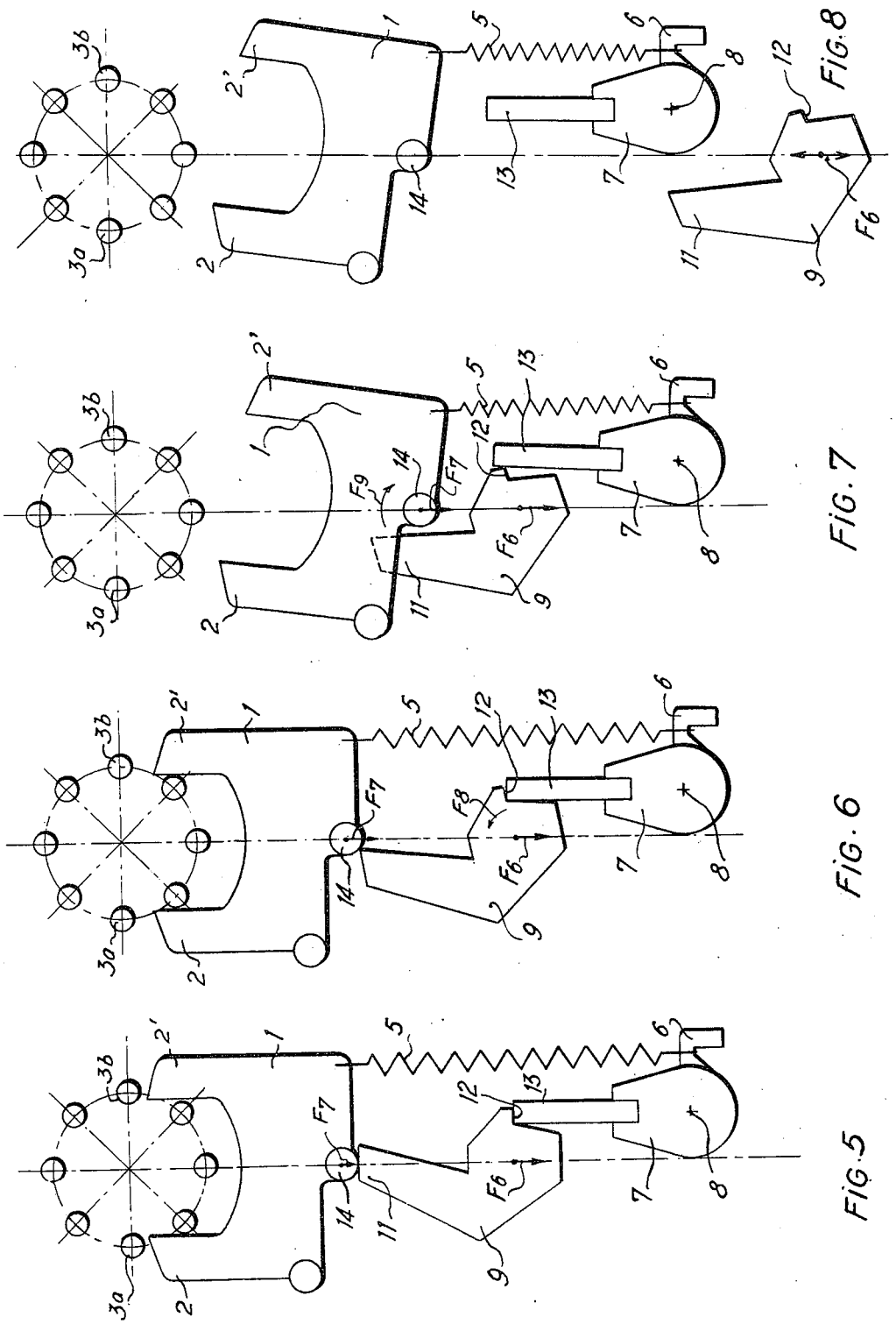

MECHANISM FOR CONTROLLING THE ADVANCE OF A MAGAZINE IN A TRANSPARENCY PROJECTOR

This invention relates to a mechanism for controlling the advance of a magazine in a transparancy projector.

Whether the magazine be of the linear or rotating type, it is conventionally advanced by means of studs on the magazine on which the arms of a fork, capable of a pivoting movement and a to-and-fro movement, exert a force so that the arms of the fork exert a force successively on the studs so that transparancies are projected in turn.

The movement of the fork is generally coupled with movement of the pusher by which the transparencies are taken from the magazine, brought into the light beam, and returned to the magazine.

The disadvantage which exists in this type of apparatus resides precisely in the fact that the fork is given these two joint movements, i.e. a forwards and backwards movement and a pivoting movement, while it is only subjected to positional constraints which are relatively ill-defined, since it does not pivot about a real shaft fixed to a member of the device, and it is only guided in its translational movement simply by biasing members.

This can cause the two branches of the fork, after or instead of having exerted their force on the studs determining the advance of the magazine, to be blocked between or against these studs which at the same time blocks the advance of the magazine.

According to the present invention there is provided a mechanism for controlling the advance of a magazine in a transparency projector comprising a fork for advancing the magazine and subjected to the action of a return spring having one end constantly fixed to a control member pivotally mounted about a fixed axis, an operating member having a cam-shaped portion cooperating with the control member, whereby the advance of the operating member towards the fork initially pivots the control member owing to the action of the cam-shaped portion, thereby pivoting the fork via the return spring, until the extreme position is reached where the fork is locked against the magazine, and on withdrawing the operating member, the fork is released from engagement with the magazine.

The mechanism ensures that the fork will be subjected to a force exerted exactly in the direction of the movement of the pusher so as to approach and move away from the magazine while remaining parallel to itself, i.e. to exert through one of its arms a force in the same direction on the advance stud of the magazine, while, during the time when the pusher is in the extreme position, i.e. during the whole of the projection time, the arms of the fork hold the magazine immobile, and finally the operating member is moved clear of the fork during the return journey of the pusher so as to allow a linear journey of the pusher.

The invention will now be described in more detail, by way of example only, with reference to the accompanying drawing, in which FIGS. 1 to 8 show the eight successive positions of a device in accordance with the invention.

The mechanism shown in the drawings comprises a fork 1, of which the two arms 2 and 2' exert a force on studs 3 of a transparency magazine, shown here as being circular.

One side of the fork 1, here the side 2' is biased downwards by a spring 5. The opposite end of this spring 5 is hooked not to a fixed point of the frame of the projector but to a finger 6 of a control part 7 pivoting about an axis 8 which is fixed relative to the projector.

The device also comprises an operating member 9 pivotally mounted about an axis 10 fixed to an element fixed to the pusher. The pusher has not been shown for the reasons of simplicity since it is known in this type of mechanism.

As can be seen in the eight figures, the operating member 9 has a cam-shaped finger 11 and a cam-shaped shoulder 12 while the control part 7 has a projection 13 intended to cooperate with the shoulder 12 as will later be explained.

Furthermore, the fork 1 has a stud 14 on which is exerted the force from the finger 11 as will later be explained.

In the eight figures, the arrows show the movements of the different elements and the way in which they cooperate with each other.

The operation of the device is the following: Suppose the lamp assembly is in the rest position, i.e. the position shown in FIG. 1, the operating member is in any position and the fork 1 is in the intermediate position exerting no force on the studs 3 and being slightly pivoted in the direction of the arm 2' under the action of the return spring.

In this position, the picture is in front of the projection window (not shown).

Figure 2:
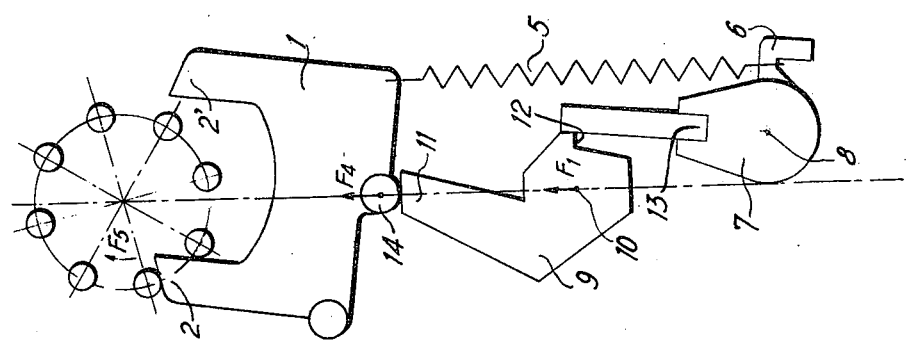

In the position of FIG. 2, the pusher is withdrawn in the direction of the arrow F1 so that the operating member 9 also withdraws disengaging the lever 13 by pivoting the part 7 in the direction of the arrow F2 while the member 9 pivots in the direction of the arrow F3 about the axis 10.

The picture therefore starts to pass into the magazine to take up its place.

Figure 3:
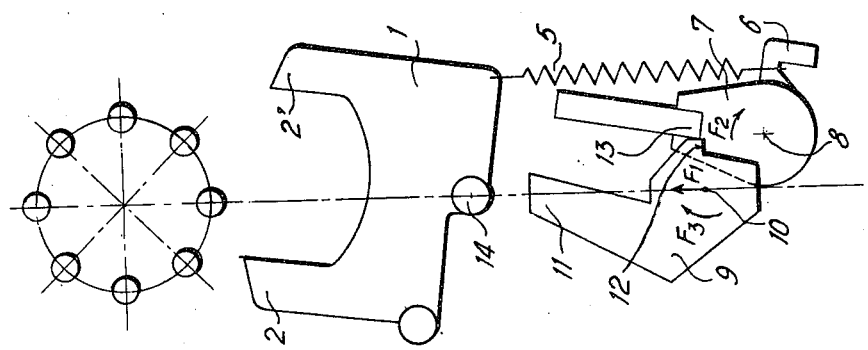

In the position of FIG. 3, the operating member has continued its journey until it came up against the stud 14 of the fork 1, which in turn drives through its arm 2 the drive stud 3a of the magazine, which pivots in the direction of the arrow F5.

Figure 4:
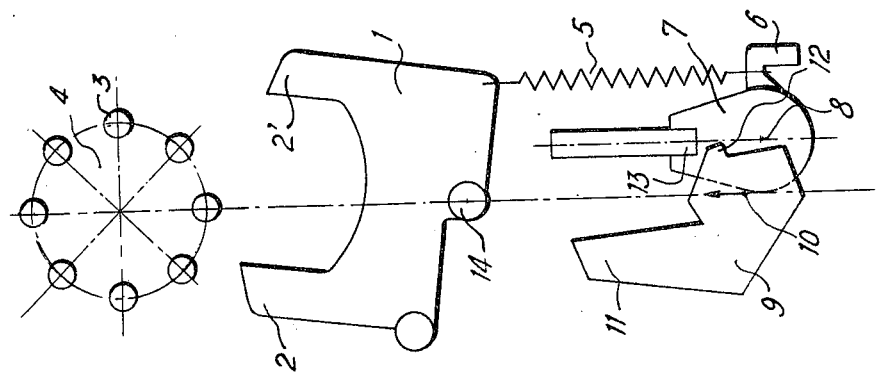

In the position of FIG. 4, the magazine has continued its advance and the studs 3a and 3b are blocked. The lever 13 has taken up its initial position under the action of the return spring 5 and the picture is completely returned to the magazine.

In the position of FIG. 5, the pusher and the operating member 9 start to move in the direction of the arrow F6, in the opposite direction to the preceding movement, and the member 9 starts to pivot in the direction of the arrow F8, bearing on the lever 7, the fork thus on the point of being freed.

In the position of FIG. 7, the fork 1 has completely escaped the end 11 of the member 9 while the shoulder 12 of this latter has also escaped the end of the lever 13 so that the fork rapidly withdraws thus freeing the drive studs of the magazine.

Finally, in FIG. 8, the pusher has completed its journey and the operating member is completely disengaged.

The new picture is thus in front of the projection window and the cycle is repeated in the same way as the different phases shown in FIGS. 1 to 7.

This new mechanism has the following advantage: Before the pusher is engaged in the magazine, the fork is rapidly disengaged following the pivoting of the lever 9 as is shown in FIG. 5.

It is then possible to move the magazine without risking catching the studs 3a and 3b with the teeth of the fork. It is clear that the invention represents an improvement with respect to prior systems, in ensuring a regular and well controlled advance of the magazine without any risk of damaging the relatively fragile elements of the projection mechanism.

What we claim is:

1. An arrangement for controlling the advance of a magazine in a transparency projector comprising a fork for advancing the magazine, a control member, a return spring acting on said fork and having one end constantly fixed to said control member, said control member being pivotally mounted about a fixed axis, an operating member having a cam-shaped portion cooperating with said control member, means for advancing the operating member towards the fork initially for pivoting the control member due to the action of the cam-shaped portion, said fork being pivoted by the return spring until an extreme position is reached, means on said cam-shaped portion for locking the fork against the magazine in said extreme position, and means for releasing said fork from engagement with the magazine upon withdrawal of said operating member, said fork being always urged in the same direction by said spring.

2. An arrangement as claimed in claim 1 wherein the cam-shaped portion leads to a shoulder cooperating in the extreme position of the operating member with a finger on the control part to lock the operating member and hence the fork in position against the magazine.

3. An arrangement as claimed in claim 2 wherein the operating member includes a projection acting on a stud on the fork to push it towards the magazine 4. An arrangement as claimed in claim 3 wherein on withdrawing the operating member the shoulder on the operating member acts on said finger to pivot the projection free of the stud on the fork.

5. The arrangement as defined in claim 1 including a wheel with pins engaged by two arms of the fork for blocking said wheel when rejecting a transparency slide of said magazine, pusher means for rejecting a slide in a forward position, lever means for freeing said fork when said pusher means travels in the reverse direction by disengagement of said pins by said fork.

* * * * *